United States Patent
Murata et al.

(10) Patent No.: US 8,736,917 B2
(45) Date of Patent: May 27, 2014

(54) OVERHEAD IMAGE-READING APPARATUS IMAGE PROCESSING METHOD, AND COMPUTER PROGRAM PRODUCT

(75) Inventors: Ikuo Murata, Ishikawa (JP); Naofumi Kado, Ishikawa (JP); Hiroyuki Kameda, Ishikawa (JP)

(73) Assignee: PFU Limited, Ishikawa (JP)

( * ) Notice: Subject to any disclaimer, the term of this patent is extended or adjusted under 35 U.S.C. 154(b) by 20 days.

(21) Appl. No.: 13/415,194

(22) Filed: Mar. 8, 2012

(65) Prior Publication Data

US 2012/0320430 A1    Dec. 20, 2012

(30) Foreign Application Priority Data

Jun. 15, 2011   (JP) .................................. 2011-133679

(51) Int. Cl.
*H04N 1/04* (2006.01)

(52) U.S. Cl.
USPC ............................. 358/474; 358/475; 358/501

(58) Field of Classification Search
CPC .... H04N 1/02815; H04N 1/0519; H04N 1/04
USPC .................. 358/474, 475, 501, 486
See application file for complete search history.

(56) References Cited

U.S. PATENT DOCUMENTS

| | | | |
|---|---|---|---|
| 5,218,200 A | 6/1993 | Morii et al. | |
| 5,515,181 A | 5/1996 | Iyoda et al. | |
| 5,625,183 A | 4/1997 | Kashitani et al. | |
| 5,757,518 A | 5/1998 | Kashitani | |
| 5,760,925 A * | 6/1998 | Saund et al. | 358/497 |
| 5,764,383 A * | 6/1998 | Saund et al. | 358/497 |
| 5,818,612 A * | 10/1998 | Segawa et al. | 358/494 |
| 5,835,241 A | 11/1998 | Saund | |
| 5,861,622 A * | 1/1999 | Tsai | 250/234 |
| 5,969,829 A * | 10/1999 | Matsuda et al. | 358/475 |
| 5,978,102 A | 11/1999 | Matsuda | |
| 5,995,245 A * | 11/1999 | Moro | 358/474 |
| 6,011,635 A * | 1/2000 | Bungo et al. | 358/488 |
| 6,164,740 A | 12/2000 | Hirai et al. | |
| 6,316,767 B1 | 11/2001 | Paxton et al. | |
| 6,325,288 B1 * | 12/2001 | Spitz | 235/462.12 |
| 6,587,227 B1 * | 7/2003 | Fullerton | 358/474 |

(Continued)

FOREIGN PATENT DOCUMENTS

| | | |
|---|---|---|
| JP | 63-107366 A | 5/1988 |
| JP | 05-161000 | 6/1993 |

(Continued)

OTHER PUBLICATIONS

United States Office Action issued in U.S. Appl. No. 13/445,436 dated Sep. 11, 2013.

(Continued)

*Primary Examiner* — Negussie Worku
(74) *Attorney, Agent, or Firm* — McDermott Will & Emery LLP

(57) ABSTRACT

An overhead image-reading apparatus includes a one-dimensional image sensor having imaging elements arranged in parallel to each other and is configured to change an angle between an optical axis of a light source and a medium to be read during reading of the medium, and the apparatus includes a correcting unit that corrects distortion in a main-scanning direction in read image data of the medium read by the apparatus.

5 Claims, 10 Drawing Sheets

(56) References Cited

U.S. PATENT DOCUMENTS

| | | | |
|---|---|---|---|
| 6,603,580 B1* | 8/2003 | Taillie | 358/474 |
| 6,609,162 B1 | 8/2003 | Shimizu et al. | |
| 6,687,420 B1* | 2/2004 | Matsuda et al. | 382/286 |
| 6,738,166 B1 | 5/2004 | Kano et al. | |
| 6,771,394 B1 | 8/2004 | Nakanishi et al. | |
| 6,963,428 B1 | 11/2005 | Gann | |
| 6,965,460 B1 | 11/2005 | Gann et al. | |
| 7,016,087 B2* | 3/2006 | Heffelfinger et al. | 358/474 |
| 7,460,284 B2 | 12/2008 | Hiromatsu | |
| 7,545,993 B2 | 6/2009 | Matsuda et al. | |
| 7,612,162 B2 | 11/2009 | Okada et al. | |
| 7,652,781 B2 | 1/2010 | Fukui et al. | |
| 7,724,390 B2 | 5/2010 | Imai | |
| 7,730,191 B2 | 6/2010 | Otsuka et al. | |
| 7,731,662 B2 | 6/2010 | Anderson et al. | |
| 7,916,331 B2 | 3/2011 | Shinozaki | |
| 7,982,919 B2 | 7/2011 | Mishima et al. | |
| 8,137,010 B2 | 3/2012 | Yoshida et al. | |
| 8,356,084 B2 | 1/2013 | Yamamoto | |
| 8,503,045 B2* | 8/2013 | Kubo et al. | 358/474 |
| 8,559,071 B2* | 10/2013 | Kawata | 358/474 |
| 2005/0175365 A1 | 8/2005 | Gomi | |
| 2007/0041039 A1 | 2/2007 | Doui | |
| 2010/0302607 A1 | 12/2010 | Hock | |
| 2011/0299135 A1 | 12/2011 | Takabatake | |
| 2011/0299136 A1 | 12/2011 | Kubo et al. | |
| 2012/0314264 A1 | 12/2012 | Kimura | |
| 2012/0320434 A1 | 12/2012 | Takeda | |
| 2012/0320437 A1 | 12/2012 | Kanaya | |

FOREIGN PATENT DOCUMENTS

| | | |
|---|---|---|
| JP | 08-009109 | 1/1996 |
| JP | 08-274956 | 10/1996 |
| JP | 2000-032232 | 1/2000 |

OTHER PUBLICATIONS

United States Office Action issued in U.S. Appl. No. 13/444,567 dated Nov. 4, 2013.
United States Office Action issued in U.S. Appl. No. 13/464,742 dated Sep. 19, 2013.
United States Office Action issued in U.S. Appl. No. 13/434,114 dated Sep. 5, 2013.
United States Office Action issued in U.S. Appl. No. 13/075,720 dated Apr. 2, 2013.
United States Office Action issued in U.S. Appl. No. 13/075,720 dated Oct. 15, 2013.
United States Office Action issued in U.S. Appl. No. 13/111,498 dated Aug. 21, 2013.
United States Office Action issued in U.S. Appl. No. 13/369,035 dated Jul. 26, 2013.

* cited by examiner

| y | m |
|---|---|
| -76 | 0.97430696 |
| ⋮ | ⋮ |
| 0 | 0.97808821 |
| ⋮ | ⋮ |
| 886 | 1.00000000 |
| ⋮ | ⋮ |
| 4336 | 0.76611713 |

FIG.14

| MAGNIFICATION: | 0.5 |
| PIXEL WIDTH w: | 8 |

| PRODUCED PIXEL COORDINATE a | REFERENCE PIXEL COORDINATE f |
|---|---|
| 1 | 2.75 |
| 2 | 3.25 |
| 3 | 3.75 |
| 4 | 4.25 |
| 5 | 4.75 |
| 6 | 5.25 |
| 7 | 5.75 |
| 8 | 6.25 |

OVERHEAD IMAGE-READING APPARATUS, IMAGE PROCESSING METHOD, AND COMPUTER PROGRAM PRODUCT

CROSS-REFERENCE TO RELATED APPLICATION

This application is based upon and claims the benefit of priority from Japanese Patent Application No. 2011-133679, filed Jun. 15, 2011, the entire contents of which are incorporated herein by reference.

BACKGROUND OF THE INVENTION

1. Field of the Invention

The present invention relates to an overhead image-reading apparatus, an image processing method, and a computer program product.

2. Description of the Related Art

Some conventional overhead image-reading apparatuses using one-dimensional image sensors correct distortion in the main-scanning direction of images.

For example, JP-A-2000-32232 discloses an image scanner including a one-dimensional image sensor that main-scans a document to be read and acquires a partial image and a sub-scanning mechanism that changes a read image of the document to be read entering the one-dimensional image sensor by rotating a reflecting mirror, and a technique in which images obtained by the main-scanning are converted based on change of an optical path length from the document to be read to the one-dimensional image sensor.

In some other overhead image-reading apparatuses, the following techniques are disclosed: a technique that corrects barrel-shaped distortion, which is distortion in the main-scanning direction, based on image and sensor information, a technique that corrects the barrel-shaped distortion based on a result of various image analyses performed for image correction, and a technique that corrects the barrel-shaped distortion by using a particular optical system generating no distortion.

The conventional overhead image-reading apparatus, such as the apparatus disclosed in JP-A-2000-32232, however, requires an X-coordinate conversion table, for example, for each reading target line. As a result, a data amount may increase. In addition, in the conventional overhead image-reading apparatus, image quality may deteriorate due to nearest-neighbor interpolation employed for image magnification, for example.

SUMMARY OF THE INVENTION

It is an object of the present invention to at least partially solve the problems in the conventional technology.

An overhead image-reading apparatus according to one aspect of the present invention includes a one-dimensional image sensor having imaging elements arranged in parallel to each other and is configured to change an angle between an optical axis of a light source and a medium to be read during reading of the medium, and the apparatus includes a correcting unit that corrects distortion in a main-scanning direction in read image data of the medium read by the apparatus.

An image processing method according to another aspect of the present invention is executed by an overhead image-reading apparatus including a one-dimensional image sensor having imaging elements arranged in parallel to each other and configured to change an angle between an optical axis of a light source and a medium to be read during reading of the medium, and the method executed by the overhead image-reading apparatus includes a correcting step of correcting distortion in a main-scanning direction in read image data of the medium read by the apparatus.

A computer program product having a non-transitory computer readable medium according to still another aspect of the present invention includes programmed instructions for an image processing method executed by an overhead image-reading apparatus including a one-dimensional image sensor having imaging elements arranged in parallel to each other and configured to change an angle between an optical axis of a light source and a medium to be read during reading of the medium, wherein the instructions, when executed by the overhead image-reading apparatus, cause the overhead image-reading apparatus to execute a correcting step of correcting distortion in a main-scanning direction in read image data of the medium read by the apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a diagram of an example of a reference pixel coordinates in the embodiment;

DETAILED DESCRIPTION OF THE PREFERRED EMBODIMENT

Embodiments of an overhead image-reading apparatus, an image processing method, and a computer program product according to the present invention will be explained in detail below based on the drawings. The embodiment does not limit the invention.

Structure of an Overhead Image-reading Apparatus 1

Figure 1:
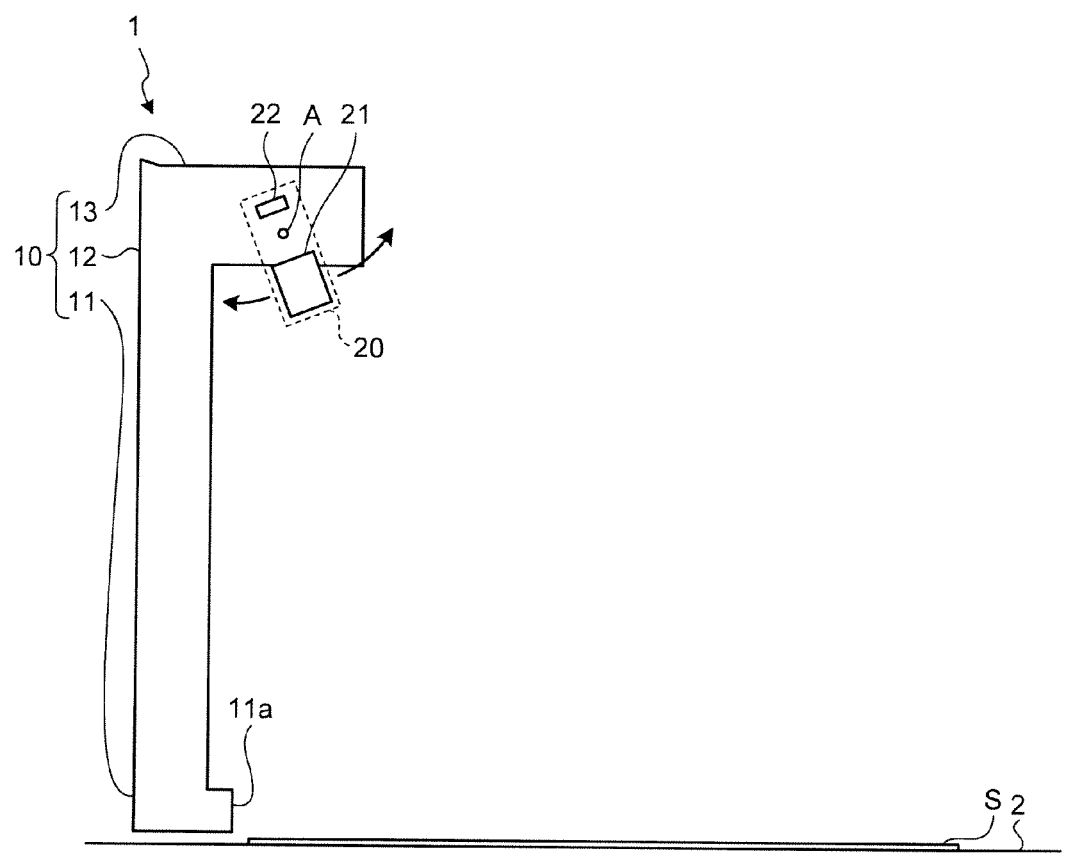
FIG. 1 is a diagram of the overhead image-reading apparatus according to the embodiment.
Figure 2:
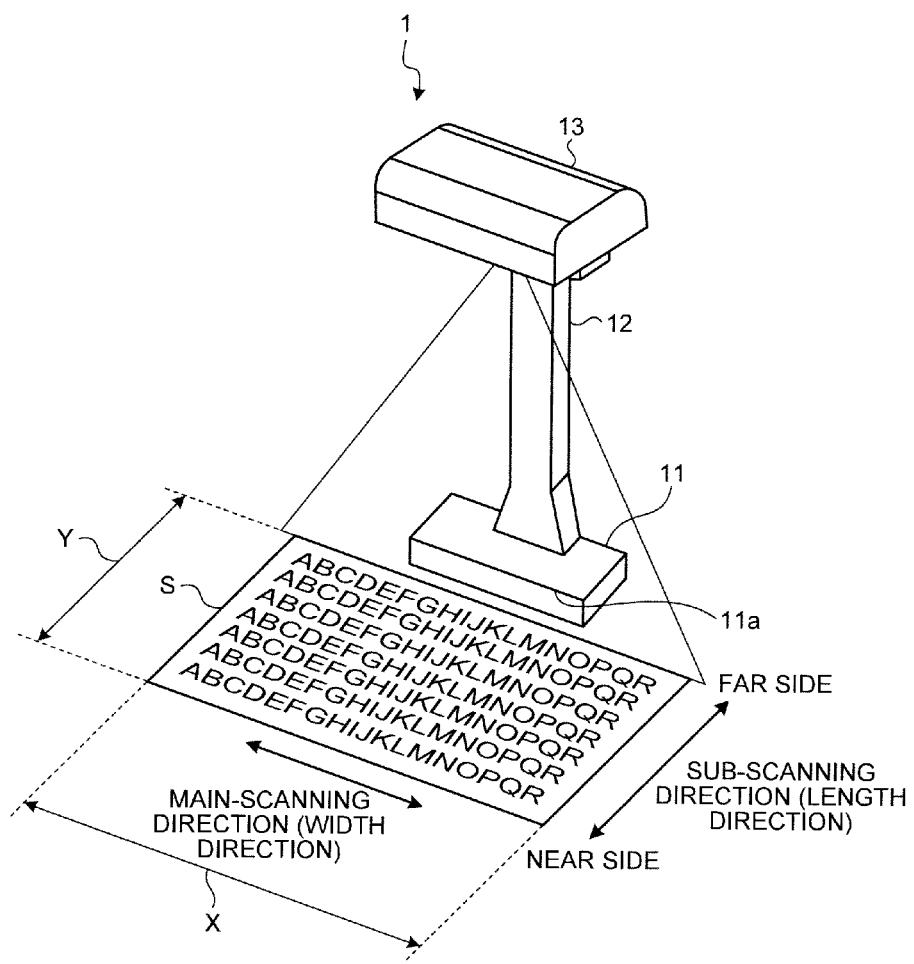
FIG. 2 is a perspective view of the overhead image-reading apparatus according to the embodiment.
Figure 3:
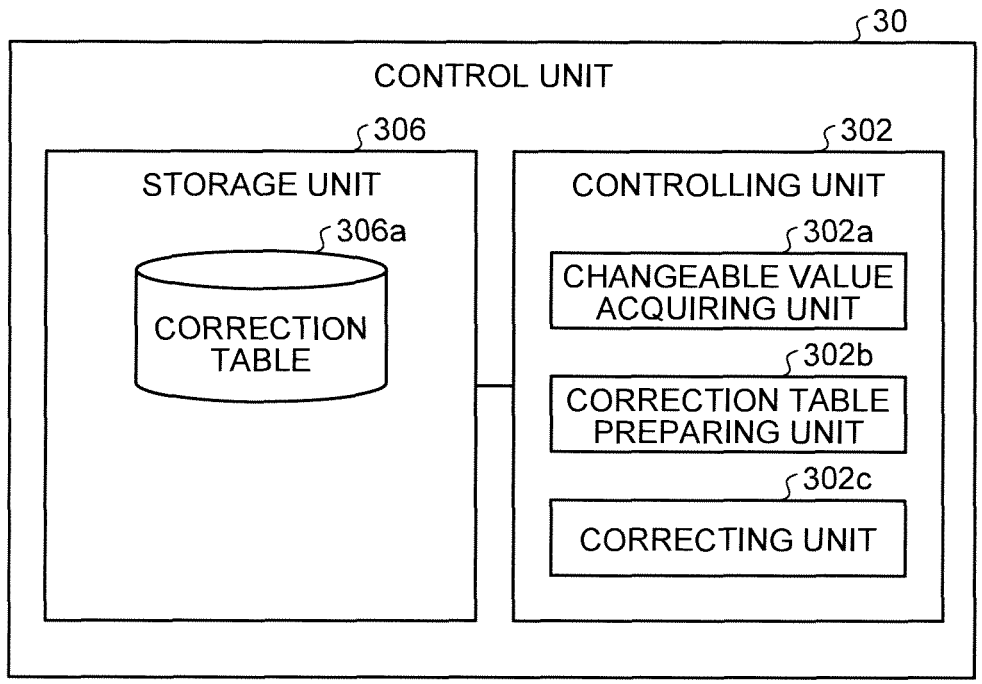
FIG. 3 is a block diagram of an example of a structure of a control unit in the embodiment.

A structure of an overhead image-reading apparatus 1 is explained below with reference to FIGS. 1 to 3. FIG. 1 is a diagram of overhead image-reading apparatus 1 and depicts a cross section perpendicular to a rotation axis A of the overhead image-reading apparatus 1 according to the embodiment. FIG. 2 is a perspective view of the overhead image-reading apparatus 1 according to the embodiment. FIG. 3 is a block diagram of an example of a structure of a control unit 30 in the embodiment and conceptually depicts only a part relating to the invention in the structure.

The overhead image-reading apparatus 1 shown in FIGS. 1 and 2 is an overhead scanner including a one-dimensional image sensor having imaging elements arranged in parallel to each other and configured to change an angle between an optical axis of a light source 21 and a medium S to be read during reading of the medium S. The overhead image-reading apparatus 1 includes a main body 10, an optical unit 20, and the control unit 30. The control unit 30 may be included inside the main body 10 or inside the optical unit 20, or may be provided at an outside of the overhead image-reading apparatus 1. The overhead image-reading apparatus 1 can read an image of the medium S to be read placed on a placement surface 2 located under the optical unit 20, i.e., a lower side in the vertical direction. The placement surface 2 is, for example, a flat surface such as a top surface of a desk. In the embodiment, the overhead image-reading apparatus 1 is placed on the same plane as the placement surface 2, as an example. The overhead image-reading apparatus 1, however, is not limited to be placed in this manner. The place on which the overhead image-reading apparatus 1 is placed may differ from the placement surface 2 on which the medium S to be read is placed. For example, the overhead image-reading apparatus 1 may be provided with a placement table having the placement surface 2.

The main body 10 includes a pedestal 11, a supporter 12, and a cover 13. The pedestal 11 is placed on the placement surface 2, for example, and supports the whole of the main body 10 as a base of the main body 10. Operation members of the overhead image-reading apparatus 1 such as a power source switch and an image-reading start switch are arranged on the pedestal 11, for example. The pedestal 11 has a flat shape, for example, and is placed such that a bottom surface thereof and the placement surface 2 are faced to each other. The pedestal 11 of the embodiment has a flat rectangular parallelepiped shape, or a similar or resembling shape thereof. The length in the vertical direction is smaller than both of the length in a width direction (a main-scanning direction, which is described later) and the length in a length direction (a sub-scanning direction, which is described later). The pedestal 11 may be shaped such that the length in the width direction is larger than the length in the length direction.

The medium S to be read is a reading target and is placed such that a side thereof abuts on a front surface 11a that is one of four side surfaces of the pedestal 11. That is, the medium S to be read is placed on the placement surface 2 such that the side thereof is parallel to the front surface 11a. In the embodiment, when the medium S to be read having a rectangular shape is placed such that a side thereof abuts on the front surface 11a, a direction parallel to the side abutting on the front surface 11a of the medium S is described as the "width direction". A direction parallel to a side perpendicular to the side abutting on the front surface 11a of the medium S to be read is described as the "length direction". That is, in the length direction, a user and the overhead image-reading apparatus 1 are faced to each other when the user faces the overhead image-reading apparatus 1 with the medium S to be read interposed therebetween. When the user faces the overhead image-reading apparatus 1 with the medium S to be read interposed therebetween in the length direction, a side near the user is described as a "near side" while a side remote from the user is described as a "far side".

The supporter 12 is connected to the pedestal 11 and extends upward in the vertical direction from the pedestal 11. The supporter 12 is formed in a columnar shape or a chimney-like shape having a rectangular cross section, for example. The lower portion of the supporter 12 is formed in a tapered shape such that more increases a cross-section thereof the more downward in the vertical direction it extends. The supporter 12 is connected to a side of an upper surface of the pedestal 11. Specifically, the supporter 12 is connected to a side of the upper surface of the pedestal 11 and the side is opposite the side on which the placed medium S to be read abuts, out of four sides forming the edge of the upper surface. In other words, the supporter 12 is connected to an end, which is remote from the medium S to be read, i.e., on the far side, of the pedestal 11. The supporter 12 is connected to the pedestal 11 at a central portion of the pedestal 11 in the width direction.

The cover 13 supports the optical unit 20 rotatably, and can house the optical unit 20 inside thereof. The cover 13 covers the optical unit 20 from the upper side in the vertical direction. The cover 13 has a concave portion formed on an under surface thereof, for example, and can house the optical unit 20 inside the concave portion. The cover 13 is connected to an upper end of the supporter 12 in the vertical direction. The cover 13 protrudes from the supporter 12 on the near side in the length direction and on both sides in the width direction. Specifically, the cover 13 protrudes from the supporter 12 to a side on which the medium S to be read is placed and to both sides in the width direction.

In the overhead image-reading apparatus 1, the pedestal 11 and the cover 13 are faced to each other in the vertical direction, and connected with the supporter 12 at both ends located on a side opposite the medium S side in the length direction. The cover 13 protrudes on the near side in the length direction beyond the pedestal 11. That is, at least a part of the cover 13 and the medium S to be read are faced to each other in the vertical direction when the medium S is placed on the placement surface 2 so as to abut on the pedestal 11.

The optical unit 20 can rotate around the rotation axis A with respect to the main body 10. The rotation axis A extends in the width direction. That is, the rotation axis A is parallel to the front surface 11a. The optical unit 20 is supported by the cover 13 rotatably around the rotation axis A. A driving unit (not shown) is disposed in an inside of the cover 13. The driving unit rotates the optical unit 20 around the rotation axis A. The driving unit includes an electric motor, and a gear unit that connects a rotation axis of the motor and the optical unit 20, for example. The motor is a stepping motor, for example, and can control a rotational angle of the optical unit 20 with high accuracy. The gear unit, which includes a combination of plural gears, for example, reduces the rotation of the motor and transmits the reduced rotation to the optical unit 20.

The optical unit 20 includes the light source 21 and an imaging unit 22. The angle made between the optical axis of the light source 21 and the medium S to be read changes during reading of the medium S. The light source 21, which is a reading light source, includes a light emitting unit such as a light-emitting diode (LED) and can irradiate the medium S to be read with light from the upper side in the vertical direction. The light source 21 may be formed with a plurality of LEDs arranged in a straight line along the main-scanning direction, for example. The light source 21 irradiates an image on a reading target line of the medium S to be read, i.e., a read image, with light. The imaging unit 22 is the one-dimensional image sensor having the imaging elements arranged in parallel to each other. For example, the imaging unit 22 is an image sensor including a charge coupled device (CCD) and can image the medium S to be read that is placed on the placement surface 2. Specifically, the imaging unit 22 converts light that is reflected by a read image on the reading target line and incident on the imaging unit 22 into electronic data by photoelectric conversion and produces image data of the read image.

The light source 21 is disposed outside the imaging unit 22 in a radial direction perpendicular to the rotation axis A. A direction of an optical axis of the light source 21 is perpendicular to the rotation axis A. The optical axis of the imaging unit 22 and the optical axis of the light source 21 coincide with each other when viewed in an axial direction of the rotation axis A. That is, light in a direction perpendicular to the rotation axis A when viewed in the axial direction of the rotation axis A is incident on the imaging unit 22 and the incident light is imaged by a lens on a light receiving surface of the imaging unit 22.

The imaging unit 22 is a line sensor including a plurality of pixels that read an image and are arranged in the main-scanning direction. The imaging unit 22 is disposed in the optical unit 20 such that the main-scanning direction is parallel to the rotation axis A. Each pixel receives light of the read image imaged by the lens on the light receiving surface and outputs an electrical signal corresponding to the received light. The imaging unit 22 can read an image on the reading target line of the medium S to be read and produce line image data in the main-scanning direction. The imaging unit 22 may be a single-line sensor or a multiple-line sensor.

The overhead image-reading apparatus 1 can acquire an image on the reading target line at any position in the sub-scanning direction on the medium S to be read by adjusting a rotational position of the optical unit 20 around the rotation axis A. The overhead image-reading apparatus 1 can acquire image data of the whole of the medium S to be read by repeating the acquisition of the line image data and positional adjustment of the reading target line by rotating the optical unit 20. That is, in the overhead image-reading apparatus 1, the document surface is scanned with irradiation light of the light source 21 in the sub-scanning direction and the imaging unit 22 reads an image of the reading target line irradiated with light, resulting in the image of the medium S to be read being produced. For example, the overhead image-reading apparatus 1 produces two-dimensional image data of the medium S to be read by reading a line image of each reading target line while the position of the reading target line is sequentially shifted from the far side to the near side in the length direction.

In the optical unit 20 of the overhead image-reading apparatus 1 of the embodiment, the optical axis of the light source 21 and the optical axis of the imaging unit 22 are along the same axis. The light source 21 and the imaging unit 22 are fixed at the respective positions in the optical unit 20 and rotated around the rotation axis A with the rotation of the optical unit 20 without changing a mutual positional relationship. Unlike in the case that the light source 21 and the imaging unit 22 are independently driven and controlled from each other and that the light source 21 and a reflective member guiding light to the imaging unit 22 are independently driven and controlled from each other, the difference is suppressed from being produced between irradiation light of the light source 21 and the imaging target position of the imaging unit 22. Therefore, the light source 21 can irradiate the reading target line serving as the imaging target of the imaging unit 22 with high positional accuracy. As an example, the center of the reading target line in the sub-scanning direction can coincide with the center of the irradiation width of light emitted from the light source 21 regardless of the rotational position of the optical unit 20. As a result, the overhead image-reading apparatus 1 of the embodiment suppresses the occurrence of light amount unevenness and the like, and improves quality of produced images.

In addition, because the difference is suppressed from being produced between irradiation light of the light source 21 and the imaging target position of the imaging unit 22, the irradiation width in the sub-scanning direction of the light source 21 can be reduced and light amount can be intensively supplied on the reading target line. As a result, the overhead image-reading apparatus 1 of the embodiment can read the medium S to be read with high resolution, and high speed.

The control unit 30 generally includes a controlling unit 302, and a storage unit 306. The controlling unit 302 is a Central Processing Unit (CPU) or the like that performs overall control on the whole overhead image-reading apparatus 1. The storage unit 306 is a device for storing various databases, tables, or the like. Each unit of the overhead image-reading apparatus 1 is communicably connected to one another via any communication channels. The optical unit 20 may connect to the controlling unit 302 and the like via an input-output control interface unit. Furthermore, the overhead image-reading apparatus 1 may be communicably connected to a network via a communication device, such as a router, and a wired communication line or a wireless communication means such as a dedicated line.

The storage unit 306 is a storage unit that is a fixed disk device such as Hard Disk Drive (HDD), Solid State Drive (SSD) and the like, and stores various databases and tables (a correction table 306a). For example, the storage unit 306 stores therein various programs, tables, files, databases, web pages, and the like used in various processing. The storage unit 306 may store produced image data. The storage unit 306 may store specification information of the overhead image-reading apparatus 1, such as a distance b between the rotation axis A and an image plane (e.g., a sensor surface) of the imaging unit 22, and the distance between the imaging unit 22 and the light source 21.

The storage unit 306 includes the correction table 306a, which is a correction value storage unit that stores a sub-scanning position y on the medium S to be read and a correction value so as to correspond to each other. The correction value may be a main-scanning magnification correction value m of the medium S to be read. The correction table 306a may be prepared by the controlling unit 302.

the controlling unit 302 includes an internal memory for storing a control program such as an Operating System (OS), programs that define various processing procedures, and necessary data. The controlling unit 302 performs information processing for executing various processing by these programs or the like. The controlling unit 302 functionally and conceptually includes a changeable value acquiring unit 302a, a correction table preparing unit 302b, and a correcting unit 302c.

The changeable value acquiring unit 302a is a changeable value acquiring unit that acquires values including the changeable values of the distance and the angle. The changeable value acquiring unit 302a may calculate a height h of the rotational center. The height h is the distance between the rotation axis A and the placement surface 2 or the medium S to be read. The changeable value acquiring unit 302a may acquire a reading range X in the main-scanning direction, a main-scanning position x that is the reading position in the main-scanning direction, a reading range Y in the sub-scanning direction, and the sub-scanning position y that is the reading position in the sub-scanning direction on the medium S to be read. The changeable value acquiring unit 302a may acquire read resolution Rr (dpi, i.e., dot per inch) of the imaging unit 22. The changeable value acquiring unit 302a may calculate the number of reading target lines Nr based on the calculated reading range Y in the sub-scanning direction.

The correction table preparing unit 302b is a correction table preparing unit that prepares the correction table 306a that stores the sub-scanning position y on the medium S to be read and the correction value so as to correspond to each other. The correction value may be the main-scanning magnification correction value m of the medium S to be read. The correction table preparing unit 302b may calculate an object-image distance L based on the sub-scanning position y that is the reading position in the sub-scanning direction, the height h of the rotational center, and the distance b between the rotation axis A and the image plane of the imaging unit 22. The object-image distance L is the distance between the imaging unit 22 and the medium S to be read and also an optical path length of each line. The correction table preparing unit 302b may calculate a reference optical path length $L_0$. The reference optical path length $L_0$ may be expressed by the equation $L_0$=h+b. The correction table preparing unit 302b may calculate the main-scanning magnification correction value m of the medium S to be read based on the object-image distance L and the reference optical path length $L_0$.

The correcting unit 302c is a correcting unit that corrects distortion in the main-scanning direction in read image data (input image) of the medium S to be read. The correcting unit 302c may acquire an output image width w, an output image length l, an image center (center pixel) c, and resolution Ri (dpi) of an output image. The output image width w may be the number of pixels Np. The output image length l may be the number of lines Ni. The correcting unit 302c may acquire a produced pixel coordinate a that is a pixel coordinate of a produced image. The correcting unit 302c may calculate a reference pixel coordinate f based on the produced pixel coordinate a and the main-scanning magnification correction value m. The correcting unit 302c may produce a produced pixel by bilinear interpolation. The correcting unit 302c may produce a produced pixel by bilinear interpolation, which calculates a tone by using the ratio between two reference pixels each represented by the reference pixel coordinate f.

Processing Executed by the Overhead Image-reading Apparatus 1

An example of the processing executed by the overhead image-reading apparatus 1 of the embodiment is explained below with reference to FIGS. 4 to 15.

Outline of the Embodiment of the Present Invention

Figure 4:
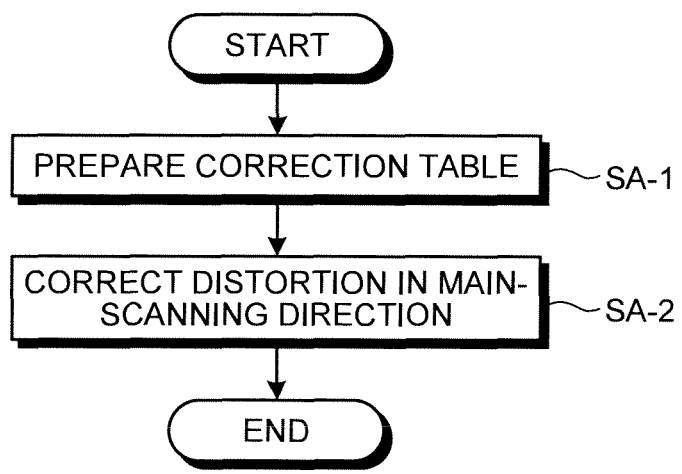
FIG. 4 is a flowchart of an example of a processing executed by the overhead image-reading apparatus in the embodiment.
Figure 5:
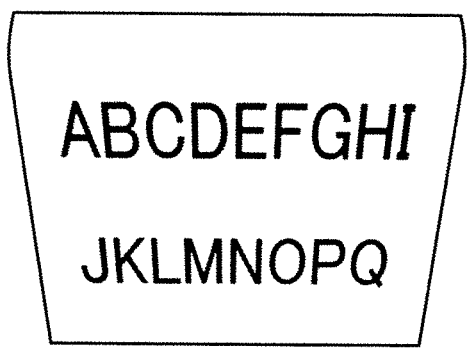
FIG. 5 is a diagram of an example of image data in the embodiment.
Figure 6:
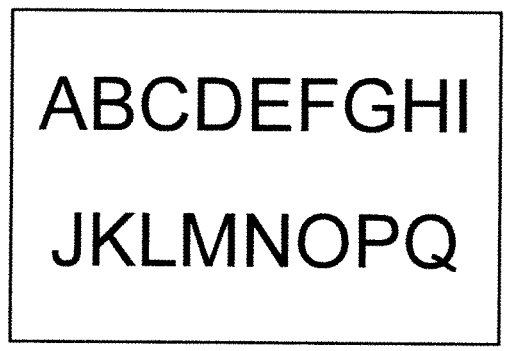
FIG. 6 is a diagram of an example of image data in the embodiment.

The outline of an embodiment of the present invention is explained below with reference to FIGS. 4 to 6. FIG. 4 is a flowchart of an example of the processing executed by the overhead image-reading apparatus 1 in the embodiment. FIGS. 5 and 6 are diagrams of an example of image data in the embodiment.

The embodiment has following basic features in general. That is, as shown in FIG. 4, the correction table preparing unit 302b prepares the correction table 306a that stores the sub-scanning position y on the medium S to be read such as a document and the correction value (e.g., the main-scanning magnification correction value m) so as to correspond to each other (step SA-1).

The correcting unit 302c corrects distortion in the main-scanning direction (e.g., barrel-shaped distortion) in read image data of the medium S to be read by using the correction table 306a prepared by the correction table preparing unit 302b at step SA-1 (step SA-2) and ends the processing.

An example of correction of the barrel-shaped distortion included in image data in the embodiment is explained with reference to FIGS. 5 and 6.

The correcting unit 302c corrects the barrel-shaped distortion included in barrel-shaped image data (input image data), which is read by the imaging unit 22, shown in FIG. 5 by using the correction table 306a and acquires rectangular-shaped image data (expected image data) shown in FIG. 6.

Correction Table Preparation Processing

Figure 7:
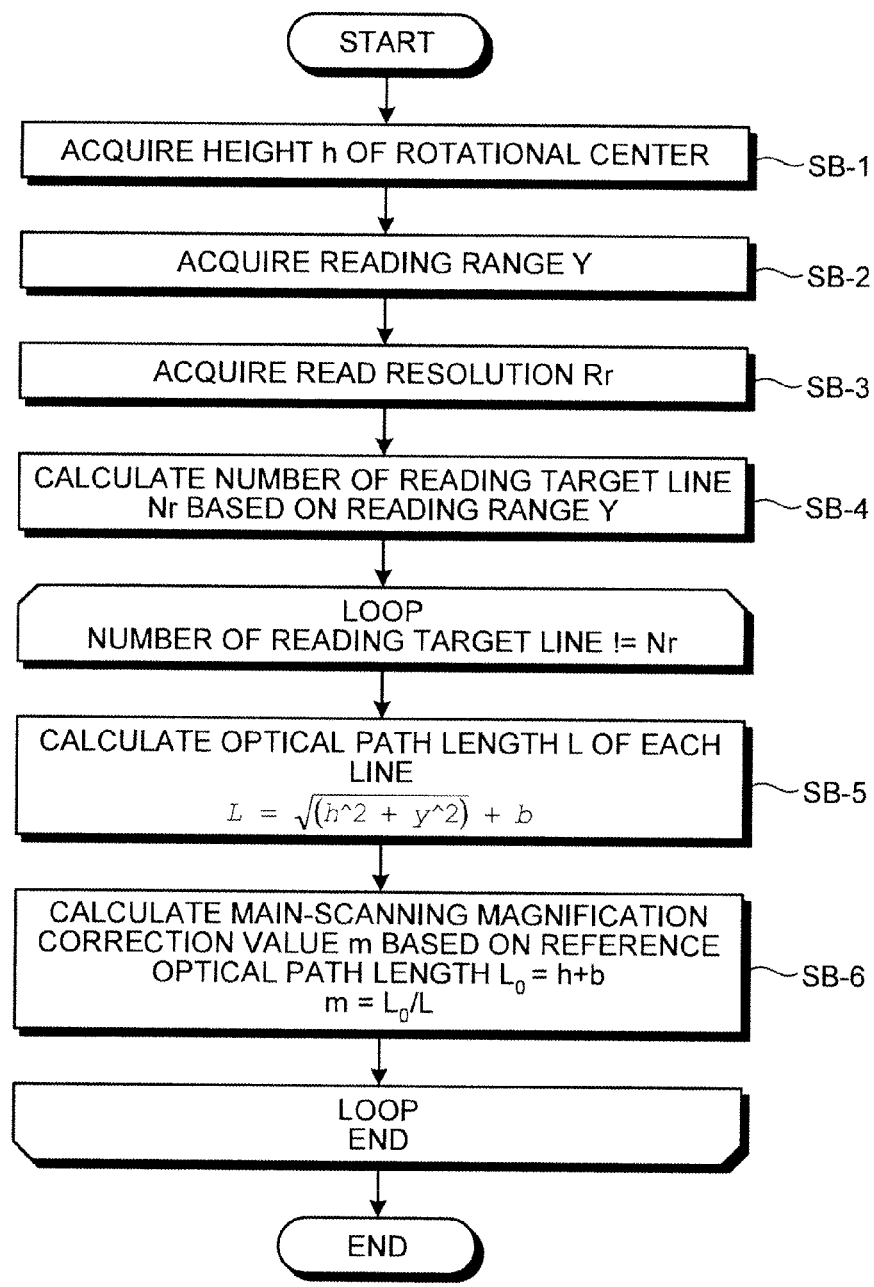
FIG. 7 is a flowchart of an example of a processing executed by the overhead image-reading apparatus in the embodiment.

An example of the main-scanning magnification correction table preparation processing of the embodiment is explained below with reference to FIGS. 7 to 9. FIG. 7 is a flowchart of an example of the processing executed by the overhead image-reading apparatus 1 in the embodiment.

As shown in FIG. 7, the changeable value acquiring unit 302a acquires the height h of the rotational center, which is the distance between the rotation axis A and the medium S to be read (step SB-1).

The changeable value acquiring unit 302a acquires the reading range Y in the sub-scanning direction on the medium S to be read (step SB-2.).

The changeable value acquiring unit 302a acquires the read resolution Rr (dpi) of the imaging unit 22 (step SB-3).

The changeable value acquiring unit 302a calculates the number of reading target lines Nr based on the reading range Y acquired at step SB-2 and the read resolution Rr (dpi) acquired at step SB-3 (step SB-4).

The correction table preparing unit 302b calculates the object-image distance L that is the distance between the imaging unit 22 and the medium S to be read and also the optical path length of each line, based on the sub-scanning position y that is the reading position in the sub-scanning direction on the medium S in the reading range Y, the height h of the rotational center, and the distance b between the rotation axis A and the image plane of the imaging unit 22 (step SB-5).

An example of the optical path length L of the embodiment is explained below with reference to FIG. 8. FIG. 8 is a diagram of an example of the optical path length L in the embodiment.

Figures 8, 9:
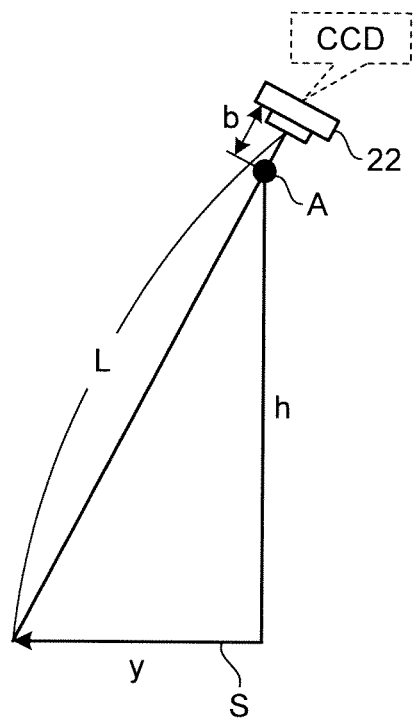
FIG. 8 is a diagram of an example of an optical path length in the embodiment.
FIG. 9 is a diagram of an example of a correction table in the embodiment.

As shown in FIG. 8, the optical path length L can be obtained by the following equation.

$$L=(h^2+y^2)^{1/2}+b$$

where y is the sub-scanning position that is the reading position in the sub-scanning direction based on the reading range Y, h is the height of the rotational center, and b is the distance between the rotation axis A and the image plane of the imaging unit (charge coupled device (CCD)) 22.

Referring back to FIG. 7, the correction table preparing unit 302b calculates the reference optical path length $L_0$ (=h+b) based on the height h of the rotational center and the distance b between the rotation axis A and the image plane of the imaging unit 22, and then calculates the main-scanning magnification correction value m (=$L_0$/L) based on the reference optical path length $L_0$ (step SB-6). If the main-scanning magnification correction value m is not calculated for all of, i.e., each of, the Nr reading target lines calculated by the changeable value acquiring unit 302a, the correction table preparing unit 302b proceeds to step SB-5. On the other hand, if the main-scanning magnification correction value m is calculated for each of the Nr reading target lines calculated by the changeable value acquiring unit 302a, the correction table preparing unit 302b prepares the correction table 306a that stores the sub-scanning position y that is the reading position in the sub-scanning direction on the medium S to be read based on the reading range Y and the main-scanning magnification correction value m so as to correspond to each other, i.e., a main-scanning magnification correction table for each line, and then ends the processing. The correction table preparing unit 302b may calculate the main-scanning magnification correction value m on the assumption that the reference optical path length $L_0$ is 100%. The correction table preparing unit 302b may calculate the main-scanning magnification correction value m by using a front side optical path length, i.e., the distance from a lens to a document, instead of the object-image distance L.

An example of the correction table 306a of the embodiment is explained below with reference to FIG. 9. FIG. 9 is a diagram of an example of the correction table 306a in the embodiment.

As shown in FIG. 9, in the correction table 306a, the sub-scanning positions y that are the reading positions in the sub-scanning direction on the medium S to be read and the main-scanning magnification correction values m are stored so as to correspond to each other.

Distortion Correction Processing

An example of the distortion correction processing of the embodiment is explained below with reference to FIGS. 10 to 15.

Distortion Correction Processing (1)

Figure 10:
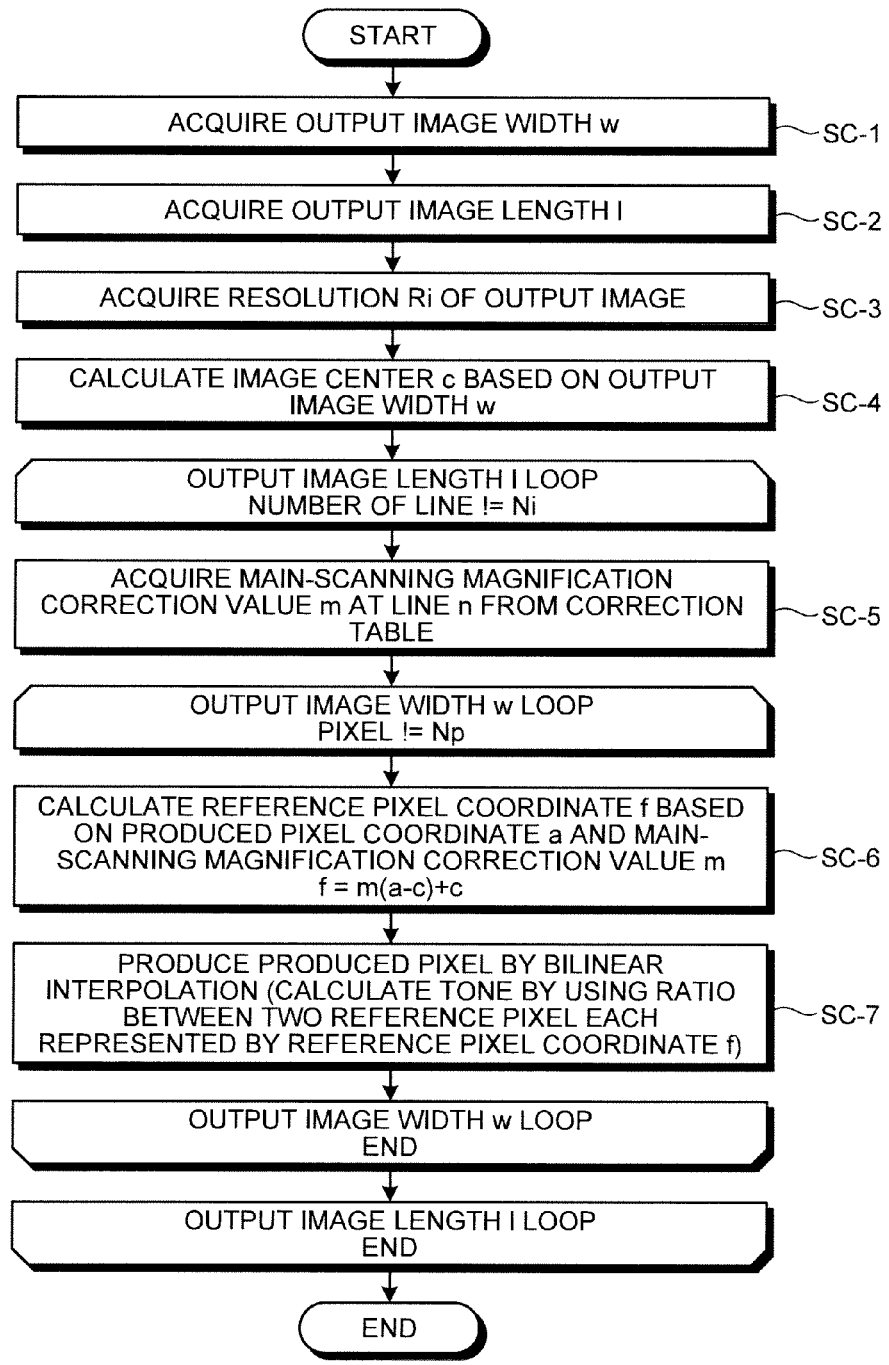
FIG. 10 is a flowchart of an example of a processing executed by the overhead image-reading apparatus in the embodiment.

An example of the distortion correction processing of the embodiment is explained below with reference to FIGS. 10 to 14. FIG. 10 is a flowchart of an example of the processing executed by the overhead image-reading apparatus 1 in the embodiment.

As shown in FIG. 10, the correcting unit 302c acquires the number of pixels Np, which is the output image width w after distortion correction (step SC-1).

The correcting unit 302c acquires the number of lines Ni, which is the output image length 1 after distortion correction (step SC-2).

The correcting unit 302c acquires the resolution Ri (dpi) of the output image after distortion correction (step SC-3).

The correcting unit 302c calculates the image center c of the output image based on the acquired output image width w (step SC-4).

Figure 11:
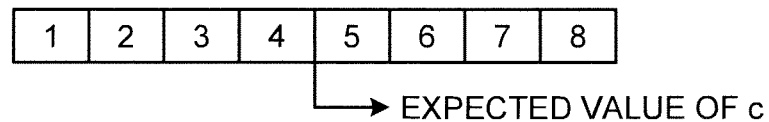
FIG. 11 is a diagram of an example of expected values of an image center of output images in the embodiment.
Figure 12:
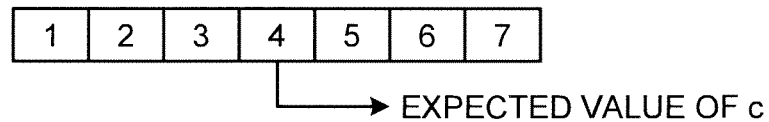
FIG. 12 is a diagram of an example of expected values of an image center of output images in the embodiment.

An example of image center calculation processing of the output image in the embodiment is explained with reference to FIGS. 11 and 12. FIGS. 11 and 12 are diagrams of an example of expected values of the image centers c of the output images in the embodiment.

As shown in FIG. 11, the correcting unit 302c calculates the expected value of the image center c as 4.5 by using the equation c=w/2+0.5 when the acquired output image width w is 8. As shown in FIG. 12, the correcting unit 302c calculates the expected value of the image center c as 4 by using the equation c=w/2+0.5 when the acquired output image width w is 7. When the image center c is calculated by simply dividing the output image width w by 2, the results are obtained as follows: c=8/2=4 when w=8 while c=7/2=3.5 when w=7. The results are out of the actual center pixels. Therefore, the image center c is calculated by dividing the output image width w by 2 and adding 0.5.

Referring back to FIG. 10, the correcting unit 302c acquires the main-scanning magnification correction value m from the correction table 306a for each of Ni lines (e.g., line n) (step SC-5).

The correcting unit 302c acquires the produced pixel coordinate a, which is the pixel coordinate of the produced image, and calculates the reference pixel coordinate f (=m(a−c)+c) of a read image represented with image data produced by the imaging unit 22 based on the acquired produced pixel coordinate a and the main-scanning magnification correction value m (step SC-6). That is, the correcting unit 302c executes main-scanning direction magnification processing for each sub-scanning position y by using the image center as the reference.

Figure 13:
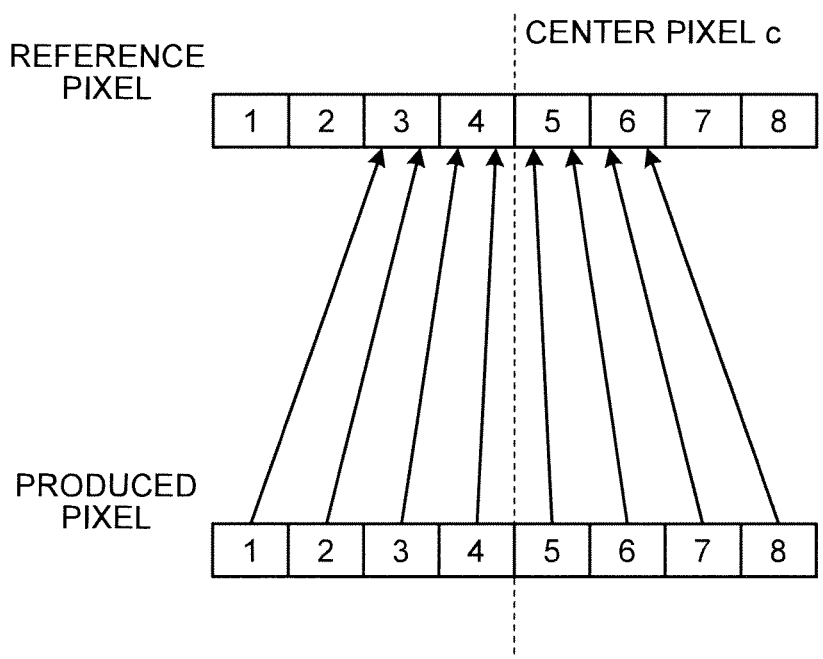
FIG. 13 is a diagram of an example of a reference pixel coordinates in the embodiment.

An example of reference pixel coordinate calculation processing in the embodiment is explained with reference to FIGS. 13 and 14. FIGS. 13 and 14 are diagrams of an example of the reference pixel coordinates f according to the embodiment.

As shown in FIGS. 13 and 14, the correcting unit 302c calculates the reference pixel coordinates f (2.75, 3.25, 3.75, 4.25, 4.75, 5.25, 5.75, and 6.25) based on the produced pixel coordinates a (1, 2, 3, 4, 5, 6, 7, and 8) and the image center (center pixel) c of 4.5 when the main-scanning magnification of the produced image is 0.5 and the output image (pixel) width w is 8.

Referring back to FIG. 10, the correcting unit 302c produces a produced pixel by bilinear interpolation, which calculates a tone by using the ratio between two reference pixels each represented by the reference pixel coordinate f (step SC-7). The correcting unit 302c proceeds to step SC-6 if all of the produced pixels corresponding to Np pixels are not produced at the line n. The correcting unit 302c proceeds to step SC-5 if all of the produced pixels corresponding to Np pixels are produced at the line n and the main-scanning magnification correction value m is not acquired from the correction table 306a for all of the Ni lines at step SC-5. On the other hand, if all of the produced pixels corresponding to Np pixels are produced at the line n and the main-scanning magnification correction value m is acquired from the correction table 306a for all of the Ni lines at step SC-5, the correcting unit 302c produces a produced image based on the produced pixels and then ends the processing.

Distortion Correction Processing (2)

Figure 15:
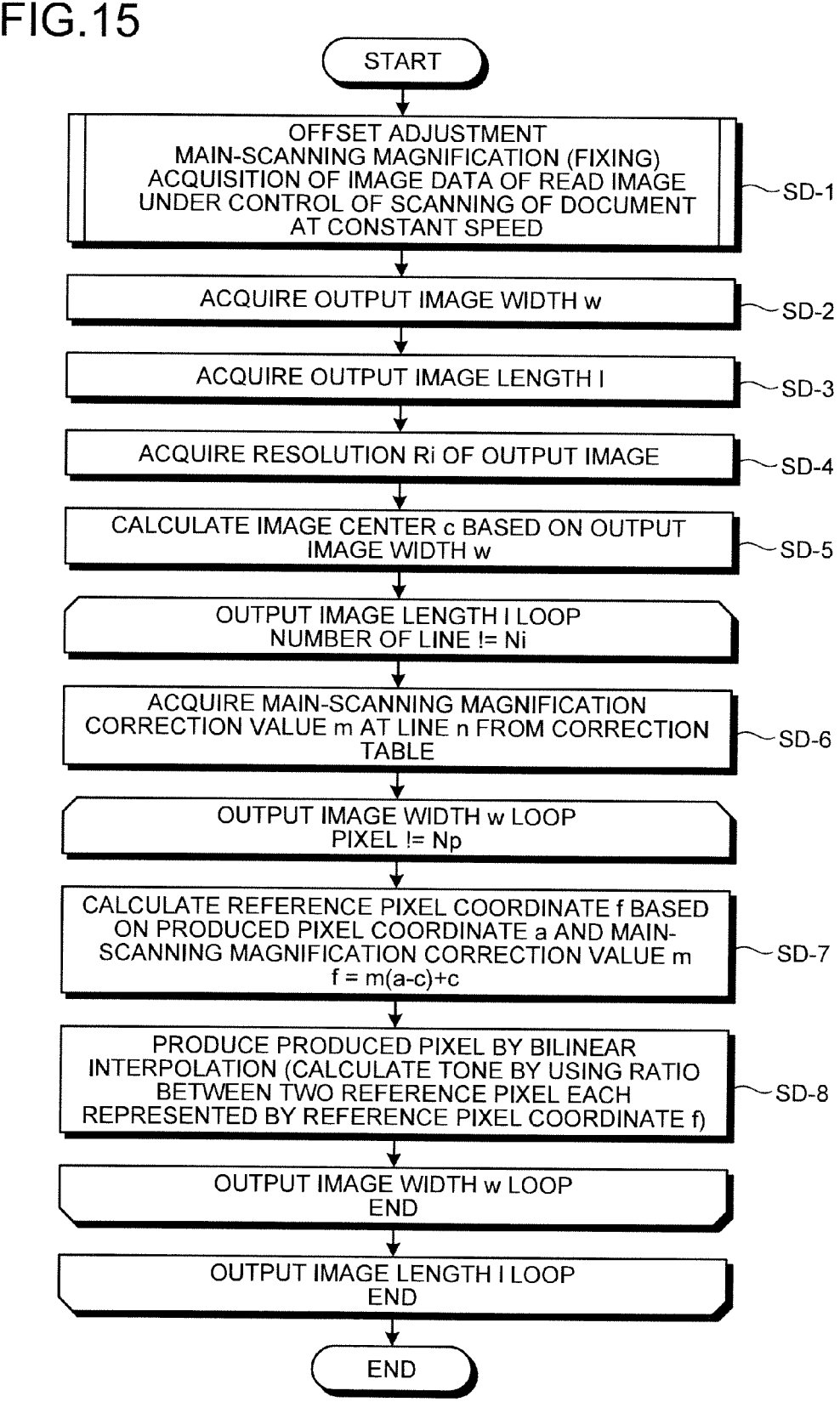
FIG. 15 is a flowchart of an example of a processing executed by the overhead image-reading apparatus in the embodiment.

An example of the distortion correction processing of the embodiment is explained below with reference to FIG. 15. FIG. 15 is a flowchart of an example of the processing executed by the overhead image-reading apparatus 1 in the embodiment.

As shown in FIG. 15, the correcting unit 302c acquires image data of images from the optical units 20 of a plurality of overhead image-reading apparatuses 1. In each optical unit 20, a sub-scanning offset is adjusted, the main-scanning magnification is fixed, a sub-scanning magnification is fixed, and the images are read under the control that documents are scanned at a constant speed (step SD-1). The acquisition of such image data from the optical units 20 can reduce load in correction processing with software, enabling the correction table 306a to be shared with the overhead image-reading apparatuses 1.

The processing from step SD-2 to step SD-8 in the distortion correction processing (2) shown in FIG. 15 is the same as that from step SC-1 to step SC-7 in the distortion correction processing (1) shown in FIG. 10 and the explanation thereof is thus omitted.

Other Embodiment

The embodiment of the present invention is explained above. However, the present invention may be implemented in various different embodiments other than the embodiment described above within a technical scope described in claims.

For example, an example in which the overhead image-reading apparatus 1 performs the processing as a standalone apparatus is explained. However, the overhead image-reading apparatus 1 can connect to an external device such as PC via network, and be configured to perform processes in response to request from the external device that includes software (computer program, data, or the like) to carry out the method of the present invention and return the process results including produced image data to the external device.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the overhead image-reading apparatus 1 are merely conceptual and may not necessarily physically resemble the structures shown in the drawings.

For example, the process functions performed by each device of the overhead image-reading apparatus 1, especially the each process function performed by the controlling unit 302, can be entirely or partially realized by CPU and a computer program executed by the CPU or by a hardware using wired logic. The computer program, recorded on a non-transitory computer readable recording medium including programmed commands for causing a computer to execute the method of the present invention, can be mechanically read by the overhead image-reading apparatus 1 as the situation demands. In other words, the storage unit 306 such as read-only memory (ROM) or hard disk drive (HDD) stores the computer program that can work in coordination with an operating system (OS) to issue commands to the CPU and cause the CPU to perform various processes. The computer program is first loaded to the random access memory (RAM), and forms the control unit in collaboration with the CPU.

Alternatively, the computer program can be stored in any application program server connected to the overhead image-reading apparatus 1 via the network, and can be fully or partially loaded as the situation demands.

The computer program may be stored in a computer-readable recording medium, or may be structured as a program product. Here, the "recording medium" includes any "portable physical medium" such as a memory card, a USB (Universal Serial Bus) memory, an SD (Secure Digital) card, a flexible disk, an optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blu-ray Disc.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

Various databases (the correction table 306a) stored in the storage unit 306 is a storage unit such as a memory device such as a RAM or a ROM, a fixed disk device such as a HDD, a flexible disk, and an optical disk, and stores therein various programs, tables, databases, and web page files used for providing various processing or web sites.

The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

According to the present invention, the correction processing can be simplified as much as possible without using particular hardware.

According to the present invention, the correction processing of distortion in the main-scanning direction included in image data can be executed at high speed.

According to the present invention, the succeeding distortion correction processing can be executed at high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An overhead image-reading apparatus comprising a one-dimensional image sensor, the overhead image-reading apparatus being configured to change an angle between an optical axis of a light source and a medium to be read during reading of the medium, the apparatus comprising:
a correcting unit that corrects distortion in a main-scanning direction in read image data of the medium read by the apparatus, wherein
the correcting unit corrects the distortion in the main-scanning direction based on a correction value corresponding to a sub-scanning position that is a reading position along a sub-scanning direction of the medium, and
the distortion to be corrected by the correcting unit is a barrel-shaped distortion caused by a change of an optical path length that is a distance between the one-dimensional image sensor and the medium to be read and that changes in accordance with the angle.

2. The overhead image-reading apparatus according to claim 1, wherein the correcting unit corrects the distortion in the main-scanning direction by using a correction table that stores a sub-scanning position and a correction value so as to correspond to each other.

3. The overhead image-reading apparatus according to claim 2, further comprising a correction table preparing unit that prepares the correction table.

4. An image processing method executed by an overhead image-reading apparatus including a one-dimensional image sensor, the overhead image-reading apparatus being configured to change an angle between an optical axis of a light source and a medium to be read during reading of the medium, the method executed by the overhead image-reading apparatus comprising:
a correcting step of correcting distortion in a main-scanning direction in read image data of the medium read by the apparatus, wherein
the correcting step corrects the distortion in the main-scanning direction based on a correction value corresponding to a sub-scanning position that is a reading position along a sub-scanning direction on the medium, and the distortion to be corrected by the correcting step is a barrel-shaped distortion caused by a change of an optical path length that a distance between the one-dimensional image sensor and the medium to be read and that changes in accordance with the angle.

5. A computer program product having a non-transitory computer readable medium including programmed instructions for an overhead image-reading apparatus including a one-dimensional image sensor, the overhead image-reading apparatus being configured to change an angle between an optical axis of a light source and a medium to be read during reading of the medium, wherein the instructions, when executed by the overhead image-reading apparatus, cause the overhead image-reading apparatus to execute a correcting step of correcting distortion in a main-scanning direction in read image data of the medium read by the apparatus, wherein the correcting step corrects the distortion in the main-scanning direction based on a correction value corresponding to a sub-scanning position that is a reading position along a sub-scanning direction on the medium, and the distortion to be corrected by the correcting step is a barrel-shaped distortion caused by a change of an optical path length that is changed between the one-dimensional image sensor and the medium to be read and that changes in accordance with the angle.

* * * * *